United States Patent [19]
Unrath, Sr.

[11] Patent Number: 5,697,657
[45] Date of Patent: Dec. 16, 1997

[54] VEHICLE MOUNTED CRASH ATTENUATION SYSTEM

[75] Inventor: Albert W. Unrath, Sr., Line Lexington, Pa.

[73] Assignee: Albert W. Unrath, Inc., Colmar, Pa.

[21] Appl. No.: 584,889

[22] Filed: Jan. 11, 1996

[51] Int. Cl.$^6$ .................................................. B60R 19/38
[52] U.S. Cl. .................. 293/118; 293/133; 293/136; 188/377
[58] Field of Search ............................. 293/1, 102, 118, 293/120, 133, 136; 188/377

[56] References Cited

U.S. PATENT DOCUMENTS

| | | | |
|---|---|---|---|
| 3,044,921 | 7/1962 | Wentworth et al. | 156/205 |
| 3,130,819 | 4/1964 | Marshall | 188/1 |
| 3,339,673 | 9/1967 | Schafer | 188/1 |
| 3,552,525 | 1/1971 | Schudel | 188/1 |
| 3,600,249 | 8/1971 | Jackson et al. | 156/197 |
| 3,616,141 | 10/1971 | Anderson | 161/68 |
| 3,733,229 | 5/1973 | Scheer et al. | 156/197 |
| 3,991,245 | 11/1976 | Jackson | 428/116 |
| 4,197,341 | 4/1980 | Rule | 428/118 |
| 4,200,310 | 4/1980 | Carney | 188/377 |
| 4,352,484 | 10/1982 | Gertz et al. | 256/13.1 |
| 4,635,981 | 1/1987 | Friton | 293/1 |
| 4,658,941 | 4/1987 | Gottwald et al. | 188/377 |
| 4,675,241 | 6/1987 | Hull | 428/116 |
| 4,711,481 | 12/1987 | Krage et al. | 293/133 |
| 4,770,420 | 9/1988 | Gottwald et al. | 293/104 |
| 4,806,573 | 2/1989 | Lee | 521/157 |
| 4,830,883 | 5/1989 | Lee | 427/244 |
| 4,986,694 | 1/1991 | Delamere | 404/6 |
| 5,052,732 | 10/1991 | Oplet et al. | 293/102 |
| 5,199,755 | 4/1993 | Gertz | 293/118 |
| 5,248,129 | 9/1993 | Gertz | 293/133 |

FOREIGN PATENT DOCUMENTS

94005527 A1  3/1994  WIPO ................ 293/133

Primary Examiner—Gary C. Hoge
Attorney, Agent, or Firm—Howell & Haferkamp, L.C.

[57] ABSTRACT

A crash attenuator adapted to be mounted on a vehicle to attenuate some of the energy of an impact, the crash attenuator includes a frame adapted to be mounted on a vehicle; a slider mounted on the frame to slide in response relative to the frame toward the vehicle in response to an impact; a collapsible, energy-absorbing member positioned between the slider and the frame to absorb energy as the slider telescopes relative to the frame; and a crushable, energy-absorbing crash cushion on the outboard side of the slider.

7 Claims, 5 Drawing Sheets

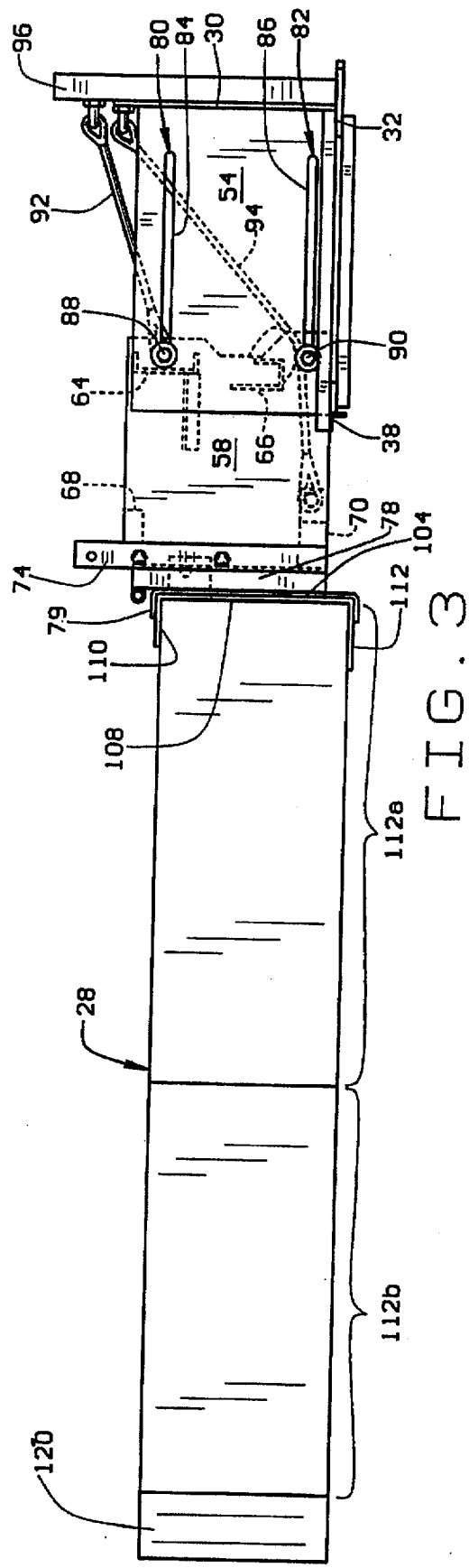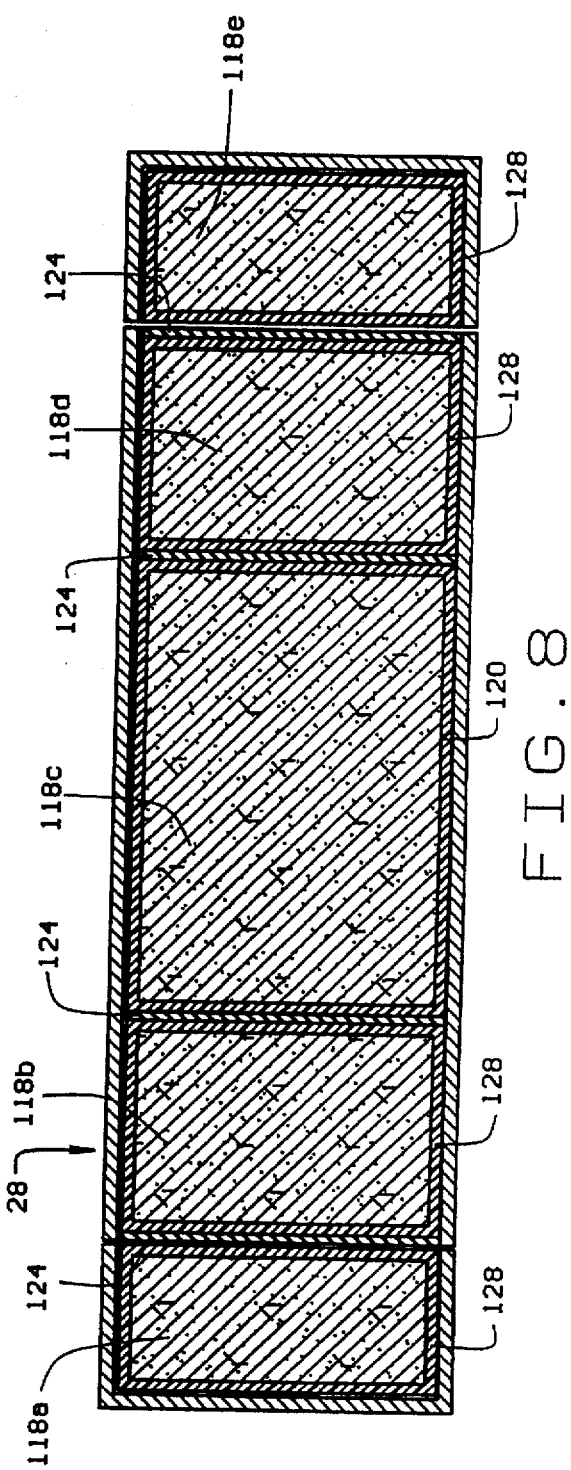

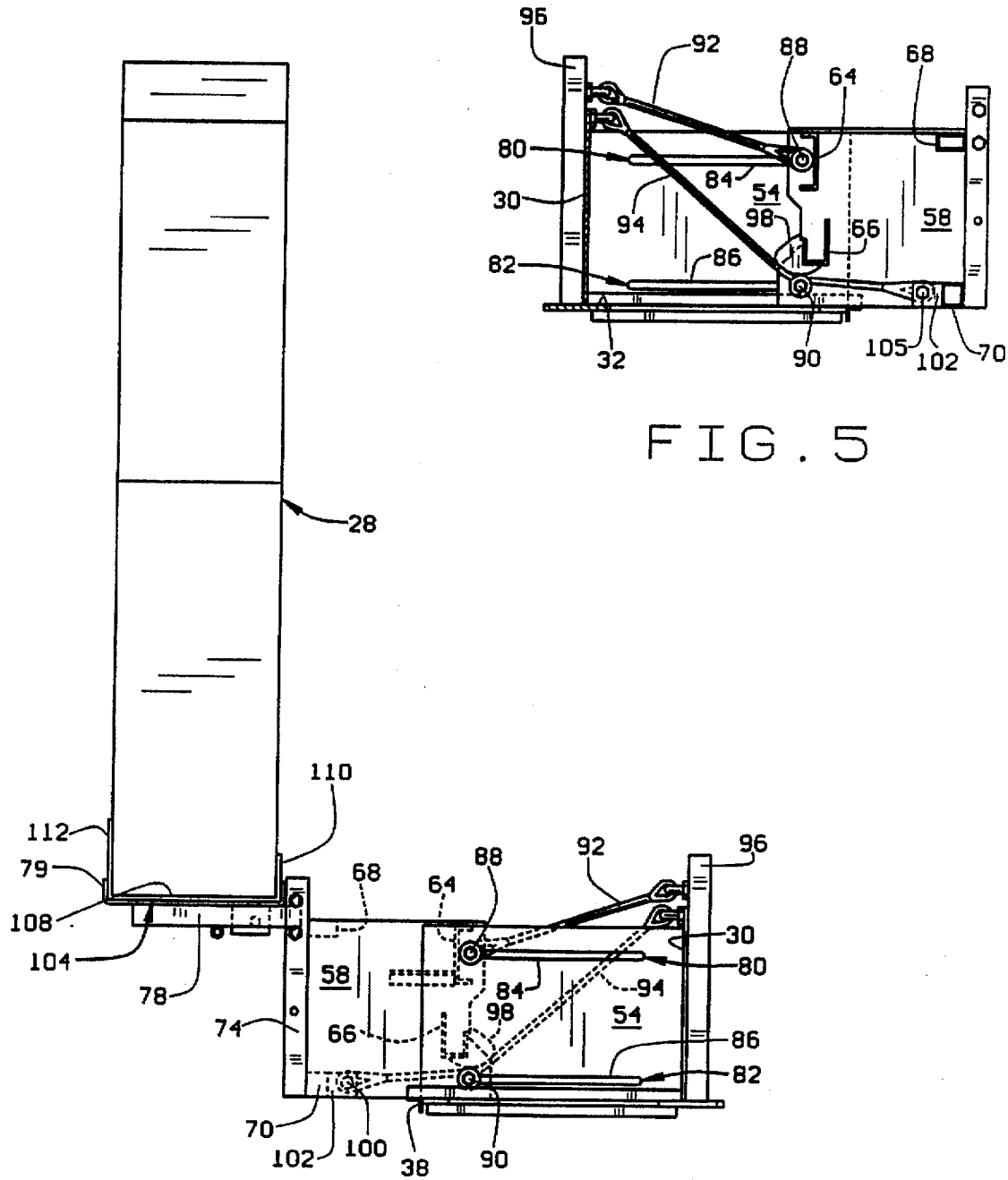

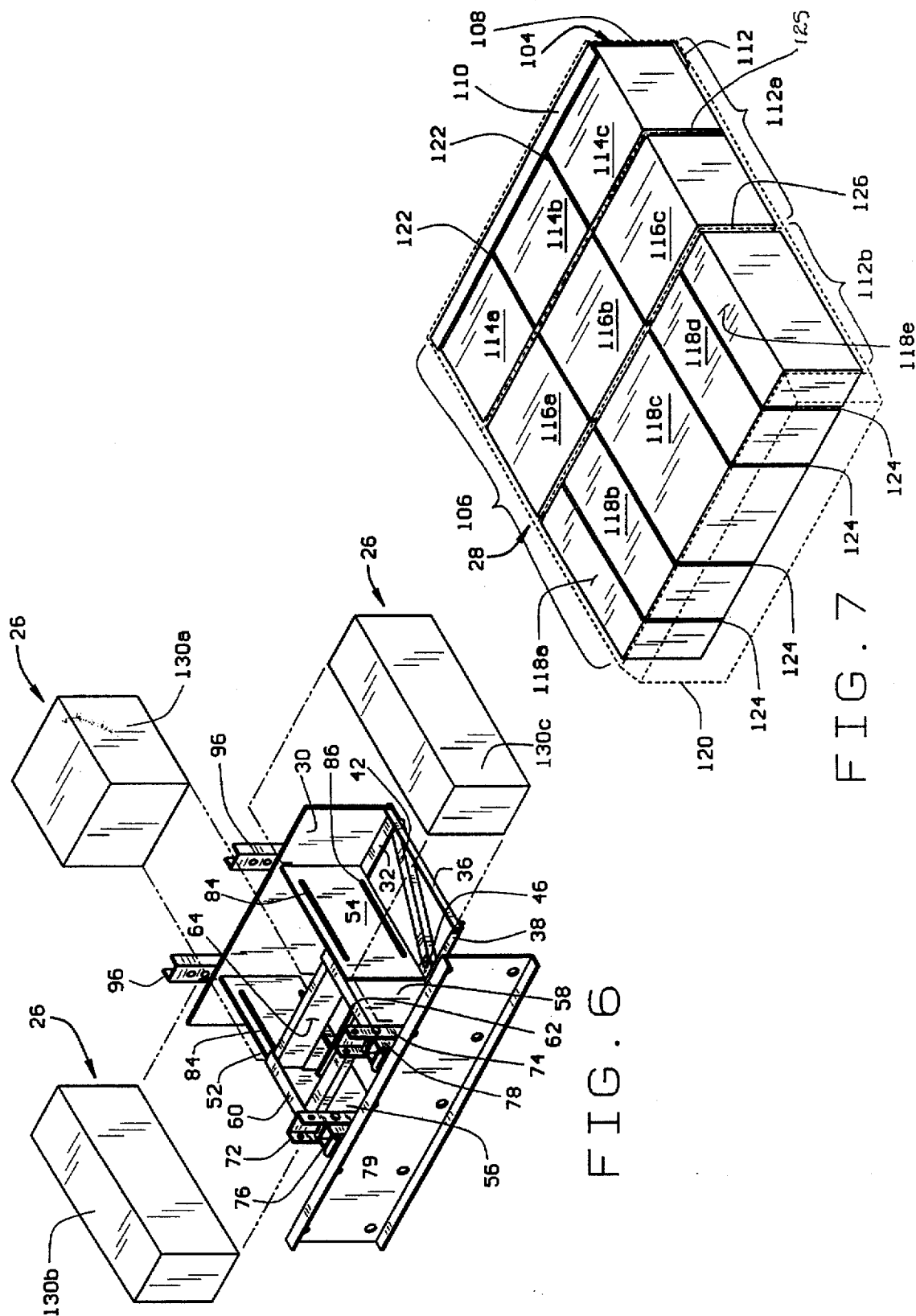

VEHICLE MOUNTED CRASH ATTENUATION SYSTEM

BACKGROUND AND SUMMARY OF THE INVENTION

This invention relates to vehicle-mounted crash attenuation systems.

Crash attenuation devices have been developed for mounting on vehicles that are parked or moving slowly on roadways, for example at construction or maintenance sites, in order to attenuate the impacts from collisions with the parked vehicle. Often times, vehicles equipped with crash attenuators are purposely deployed around work sites to shield workers at the site from being hit. Instead, errant vehicles strike the attenuator which arrests the motion of the vehicle and dissipates its impact energy. Examples of these attenuation devices are disclosed in U.S. Pat. Nos. 4,635,981, 4,668,941, 5,052,732, 4,635,981, and 4,658,941 incorporated herein by reference.

In order to accommodate impacts at highway speeds, attenuation devices need to be quite large. Because of the difficulty in operating vehicles with a large attenuation device extending from vehicle, these attenuation devices are often pivotally mounted on vehicles, so that they can be pivoted into a vertical position so that the vehicle can be more easily moved.

While crash attenuation devices have proven to be valuable both in protecting workers at work sites and in protecting motorists, those presently available still have a number of problems. One such problem is that the attenuation devices are easily damaged, and repair or replacement of the damaged devices can be expensive. Many of these attenuation devices were subject to vibration damage from the movement of the vehicles onto which they were mounted. A further problem is that many of these devices are incapable of completely attenuating high speed impacts, and many do not come close to complying with the 65 mph impact standards (NCHRP-350) recently promulgated by the U.S. Department of Transportation.

The crash attenuation device of the present invention is adapted for mounting on a vehicle to attenuate the impacts from collisions. Generally, the attenuation device of the present invention comprises a frame adapted to be mounted on the vehicle, and a slider mounted on the frame to slide relative to the frame toward the vehicle in response to an impact. At least one collapsible, energy-absorbing member positioned between the slider and the frame to absorb energy as the slider telescopes relative to the frame. A crushable, energy-absorbing crash cushion is mounted on the outside side of the slider.

The crushable, energy-absorbing crash cushion is preferably pivotally mounted on the slider to pivot between a horizontal position deployed position in which the crash cushion extends horizontally to intercept impacts, and a vertical storage position in which the crash cushion extends generally vertically to facilitate movement of the vehicle. The crash cushion preferably comprises at least two sections of different energy absorption capability. Replaceable cartridges are preferably mounted on the back and rear sides of the crash cushion to absorb minor impacts without making the entire crash cushion unserviceable.

The crash attenuation device of the present invention arrests the motion of the impacting vehicle and dissipates its impact energy. The device is stable and resists damage induced from movement of the vehicle on which it is mounted. The device can be easily and simply repaired, rather than requiring replacement upon minor collisions. These and other features and advantages will be in part apparent, and part pointed out hereinafter.

BRIEF DESCRIPTION OF THE DRAWINGS

FIG. 3 is a right side elevation view of the crash attenuation system, in its deployed position;

FIG. 4 is a right side elevation view of the crash attenuation system, in its retracted position;

FIG. 5 is a partial longitudinal cross-sectional view of the frame and slider with the collapsible energy absorbing members removed taken along the plane of line 5—5 in FIG. 2;

FIG. 6 is a perspective view of the frame and slider with the collapsible, energy-absorbing members removed to show details of the construction;

FIG. 7 is a perspective view of the crash cushion, with the shell removed to show the size and positioning of the individual crash cartridges; and FIG. 8 is a transverse cross sectional view of the crash cushion, taken along the plane of line 8—8 in FIG. 2.

Corresponding reference numerals indicate corresponding parts throughout the several views of the drawings.

DETAILED DESCRIPTION OF THE PREFERRED EMBODIMENTS

Figure 1:
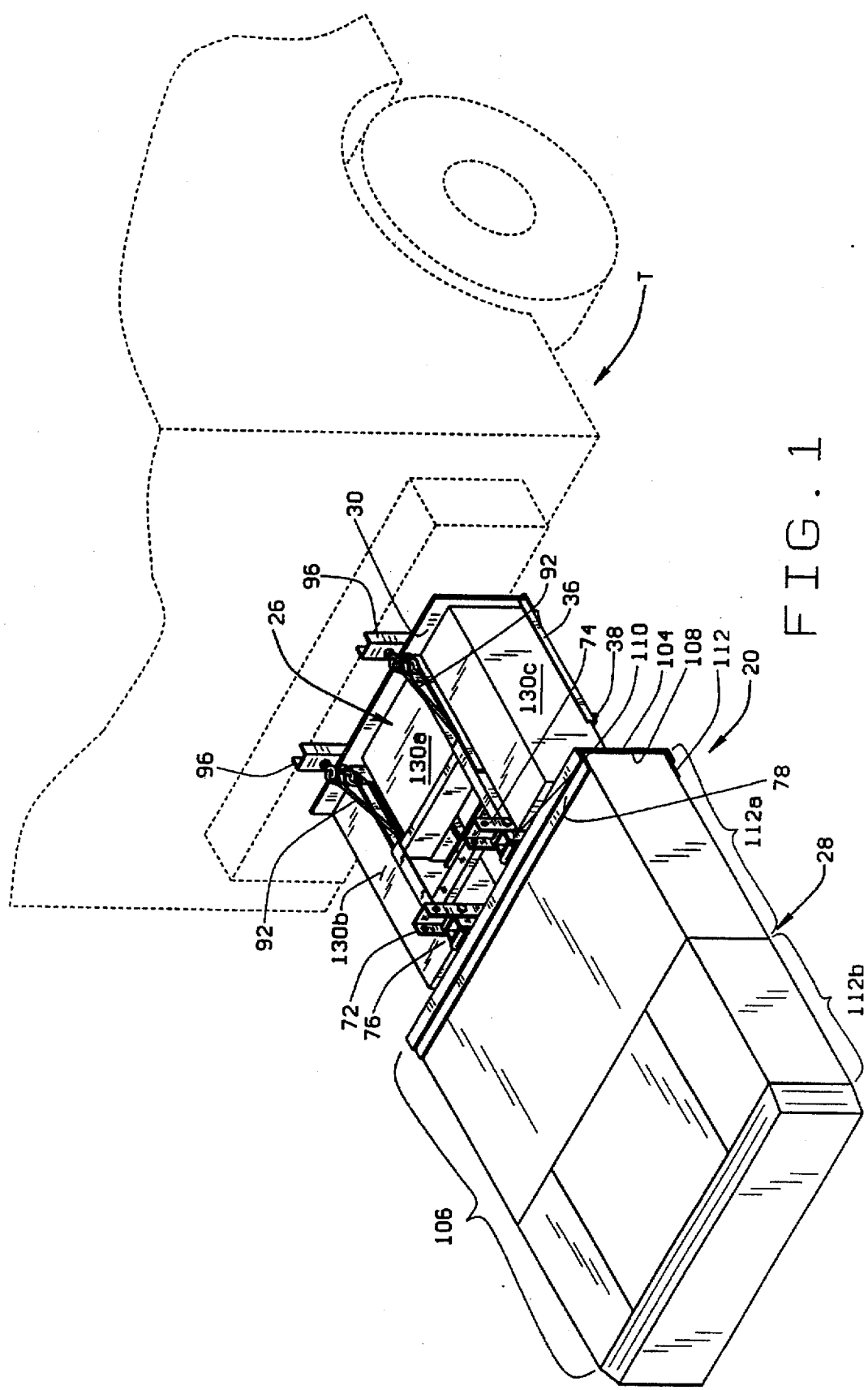
FIG. 1 is a perspective view of a crash attenuation system constructed according to the principles of the present invention, shown as it would be mounted on a vehicle.

A crash attenuator constructed according to the principles of this invention is indicated generally as 20 in the Figures. As shown in FIG. 1, the crash attenuator 20 is adapted to be mounted on a vehicle, such as truck T, and deployed in order to arrest the motion of a vehicle colliding with the attenuator and dissipate its impact energy.

As shown in FIGS. 1–9 the crash attenuator generally comprises a frame 22 adapted to be mounted on a vehicle, and a slider 24 mounted on the frame to telescope relative to the frame toward the vehicle in response to an impact. At least one collapsible, energy-absorbing member 26 is positioned between the slider 24 and the frame 22 to absorb energy as the slider telescopes relative to the frame. A crushable, energy absorbing crash cushion 28 is provided on the outboard side of the slider.

Figure 2:
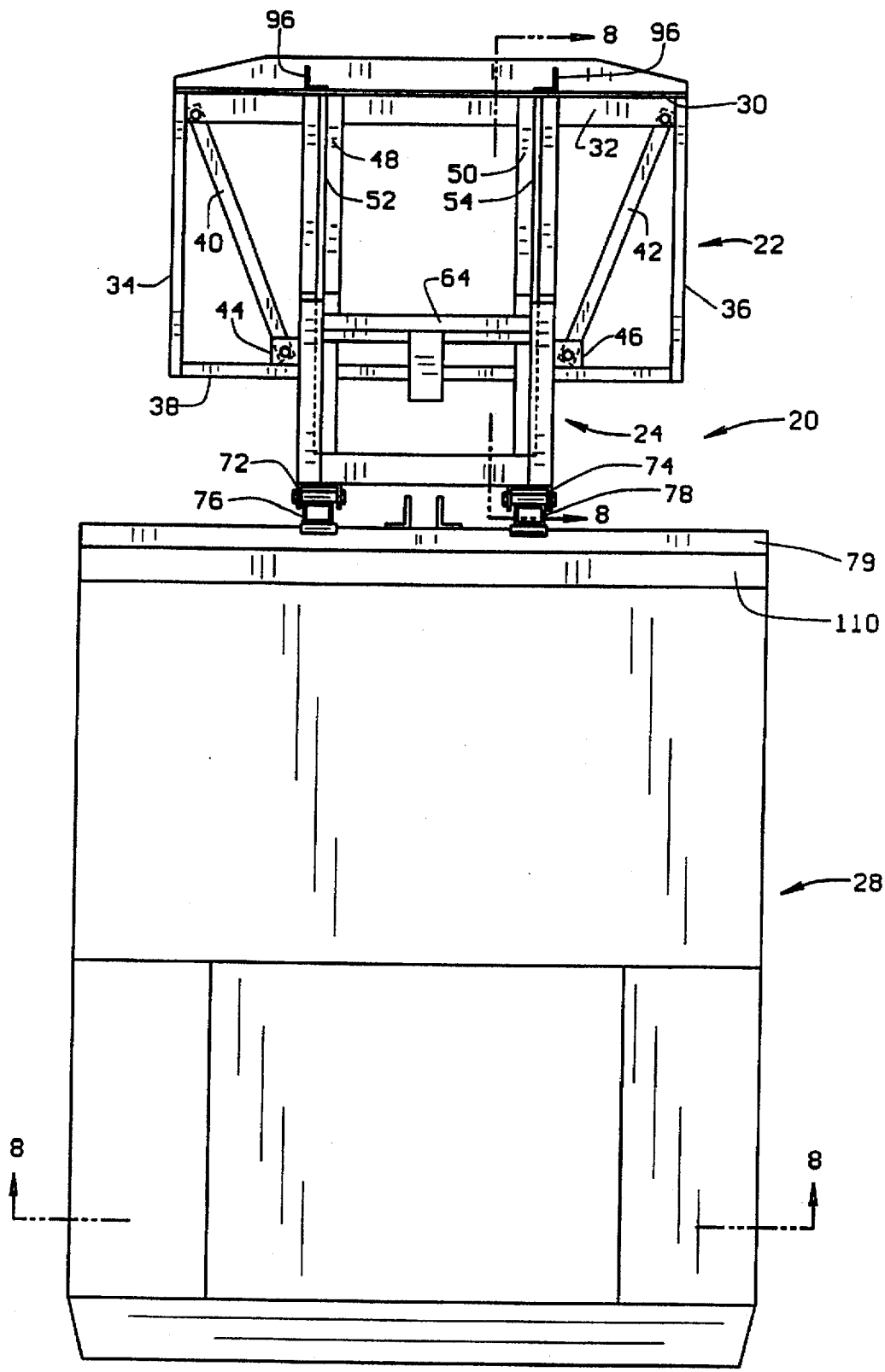
FIG. 2 is top plan view of the crash attenuation system.

As shown in FIGS. 2, 3, and 6, the frame 22 comprises a back plate 30 adapted for mounting on the vehicle. The back plate 30 has a lip 32 projecting at a right angle distally from its bottom edge. Left and right side members 34 and 36 extend distally from the lip 32 at the left and right sides, respectively, of the frame. A cross member 38 extends between the distal ends of the side members 34 and 36. Left and right tie members 40 and 42 extend at an angle between the lip 32 of the back plate, and tabs 44 and 46 on the cross member 38.

Two flat horizontal strips 48 and 50 (FIGS. 2, 4, and 5) extend distally from the lip 32 of the back plate 30, perpendicular to the cross member 38. Vertical plates 52 and 54 extend distally from the back plate 30 to the cross member 38, generally along the outer edges of the strips 48 and 50. The slider 24 has the ability to slide between the plates 52 and 54, to slide in the proximal (forward) direction, telescoping into the frame 22 under the force of a proximal impact. The slider 24 comprises left and right side panels 56 and 58, each having a lip 60 and 62, respectively, at its top edge that projects laterally toward the other. There are a plurality of cross members extending between the side panels 56 and 58. More specifically, a C-shaped channel member 64 extends horizontally between the left and right side panels, adjacent the top, proximal corners of the panels. A reverse J-shaped channel member 66 extends horizontally between the left and right side panels adjacent the distal edges of the panels, below the C-shaped channel member 64. A rectangular tube 68 extends horizontally between the panels adjacent the top, distal corners of the panels, and a square tube 70 extends horizontally between the panels adjacent the bottom distal corners of the panels.

C-shaped channels 72 and 74 (FIGS. 4, 5, and 6) extend vertically at the left and right sides of the distal end of the slider 24, with the channels facing distally. The top ends of brackets 76 and 78 are pivotally mounted in the channels 72 and 74, respectively, to pivot upwardly. The brackets 76 and 78 each comprise a square tube having a sleeve secured on one face, the sleeve being secured between side walls of one of the C-shaped channels 72 or 74. C-shaped mounting plate 79 is secured on the brackets 76 and 78, for mounting the crash cushion 28.

As shown in FIGS. 1 and 6, either the frame 22 or the slider 24 is provided with tracks, and the other of the frame and the slider is provided with track followers to guide the telescoping motion of the slider proximally into the frame. In this preferred embodiment there are preferably upper and lower tracks 80 and 82 extending horizontally in the plates 52 and 54. These tracks are preferably slots 84 and 86 in the plates. The track followers are slide pins and slide plates attached to slider 24 that fit in these slots. In this preferred embodiment, the track followers are rods 88 and 90 extending laterally from the panels adjacent the upper proximal and lower proximal corners, respectively. These rods extend through the slots 80 and 82, and have a large washer and nut secured on each end to help retain the rods in the slots and prevent the slider from turning, yet permit the rods to slide horizontally within the slots.

Upper and lower support cables 92 and 94 (FIGS. 4 and 5) are provided on each side of the slider to help support the slider. The proximal end of the upper support cable is secured to the frame 22, and more particularly to the upper end of one of two channel members 96 provided on the proximal face of plate 30. The distal end of the upper support cable 92 is secured to the upper rod 88 on the slider. The proximal end of the lower support cable 94 is also secured to the frame 22, and more particularly to the plate 30 and channel member 96 at a point below the attachment of the upper support cable. The lower support cable 94 extends distally around a guide 98 secured on the reverse J-shaped channel member 66, and the distal end of the lower support cable is secured on a bolt 100 projecting from a tab 102 on the cross member 70. The upper and lower support cables help support the slider 24.

As described above and shown in FIG. 7, the crash cushion 28 is mounted on the mounting plate 79. The crash cushion 28 comprises a back plate 104 and an energy absorbing section body 106. The back plate 104 has a vertical section 108, a top section 110 extending over the top proximal edge of the energy absorbing body 106, and a lower section 112 extending under the bottom proximal edge of the energy absorbing body. The energy absorbing body 106 comprises a plurality of individual cartridges. The cartridges are arranged to provide at least two sections 112a and 112b of different impact absorption. The proximal section 112a has a greater impact resistance, and the cartridges forming this section resist any crushing or other damage at lower speed impacts, while the distal section 112b has lesser impact resistance, and the cartridges forming this section are more easily damaged and bear the brunt of low and moderate speed impacts.

The proximal section 112a (FIG. 7) comprises a total of six cartridges arranged in two rows of three cartridges. Cartridges 114a, 114b, and 114c are on the proximal end of the section and cartridges 116 are on the distal end of the section. Each of the cartridges 114 and 116 is preferably made of layers of hexagonal paper cells. The cells at the proximal end of the cartridges preferably have a 1" cell size, and the cells at the distal end of the cartridge preferably have a ¾" cell size. These materials are sufficiently strong to resist damage if the crash attenuator is impacted at speeds of less than about 30 miles per hour. A suitable material is Hexcomb closed cell available from Tenneco Packaging of North Haven, Conn. 06473. Each cartridge is encased in a heat-sealed corrugated plastic container. The container is a single layer of plastic containment manufactured by Data Packaging of Fairfield, N.J. 07004. The cartridges can further be wrapped with for example, plastic sheet and tape to protect them from degradation, single layer wrap 4 mil Polysheet, manufactured by Dow Chemical.

As shown in FIG. 7, the distal section 112b comprises five cartridges 118a, 118b, 118c, 118d, and 118e. Each of the cartridges 118 is preferably made of layers of hexagonal paper cells, having a 1" cell size. This material is readily crushable to absorb energy from impacts at speeds of less than about 30 miles per hour. A suitable material is a Hexcomb closed cell encased in a heat-sealed corrugated plastic container of single layer plastic manufactured by Data Packaging. Each cartridge is further protected from degradation by wrapping it with a single layer of 4 mil Polysheet and tape, manufactured by Dow Chemical. An end cap 120 is provided on the distal end of the energy absorbing body 106. The end cap 120 is made of layers of hexagonal paper cells, preferably having a 1½ inch cell size. The end cap 120 is encased in heat-sealed corrugated plastic container. The cap is further covered in a thin (0.035 inch) aluminum sheet. The cartridges 118a and 118e are also covered in thin (0.050 inch) aluminum sheets. The end cap 120 and the cartridges 118a and 118e on the sides of distal section 112 function as "nuisance cushion" sacrificially absorbing minor impacts and abuse, and can be easily replaced. The end cap 120 and the entire cartridges 112a and 112b are preferably painted OSHA yellow special.

The cartridges 114a, 114b and 114c (FIG. 7) of the proximal section 112a are separated by two panels 122 of thin aluminum material. Likewise the cartridges 116a, 116b and 116c of the proximal section 112 are separated by two panels. Similarly, the cartridges 118 forming the distal section 112b are separated by two panels 124 of thin (0.035 inch thick) aluminum material. A panel 125 of medium gauge (e.g., 0.050 inch thick) aluminum sheet separates the cartridges 114 from the cartridges 116. A panel 126 of medium gauge (e.g., 0.065 inch thick) aluminum sheet separating the proximal and distal sections 112a and 112b. The cartridges 114a, 114b, 114c, 116a, 116b, 116c, 118b, 118c, and 118d are encased in thin (0.035 inch) aluminum skin 128. The skin 128 is preferably painted OSHA yellow special.

There is also at least one energy absorbing member 26 (FIG. 6) provided between the slider 24 and the frame 22 to absorb energy as the slider telescopes into the frame. In this preferred embodiment there are three such member 130a, 130b, and 130c. The member 130a is adapted to fit between the plates 52 and 54, between the slider 24 and the plate 30. The members 130b and 130c are adapted to fit on the outside of the plates 52 and 54, between the plate 30 and the mounting plate 79. As the slider 24 telescopes proximally into the frame 22, the members 130 crush, absorbing the impact energy. Each of the members 130 is preferably made of stacks of hexagonal paper cells, having a ⅝ inch cell size. A suitable material is Hexcomb closed cell encased in a heat-sealed corrugated plastic container of single layer plastic manufactured by Data Packaging. The cartridges are further protected from degradation by wrapping it with a single layer of 4 mil Polysheet tape, manufactured by Dow Chemical. All the cartridges 130 are wrapped in their (0.035 inch) aluminum to protect from the elements and road damage, and are preferably painted OSHA yellow special.

OPERATION

In operation, the crash attenuator is mounted on the back of a vehicle, for example a truck T. While the truck T is being transported, the crash cushion 28 is maintained in its upright (non-operation) position, to make the truck easier to maneuver. Once the truck is at the work site, and crash cushion is lowered to its horizontal, deployed position, where it projects horizontally outwardly from the truck. Should a vehicle strike the crash attenuator 20 at low speed, for example less than 5 miles per hour, the end cap 120 would be crushed, but the remainder of the crash cushion, and the crash attenuator could remain basically intact. The crash attenuator could be quickly refurbished for service by replacing the end cap 120. If the attenuator were impacted at a greater speed, for example between 5 and 30 miles per hour, the distal section 112b of the crash cushion would collapse to absorb the energy of this impact, but the proximal portion 112a would generally resist any damage. The crash attenuator could then be refurbished simply by replacing the crash cushion, but the cartridges 114 could be reused. If the attenuator were impacted at even greater speeds up to its 65 m.p.h. design, then the entire crash cushion might be collapsed, and eventually the slider 24 would be telescoped into the frame 22, collapsing the members 130.

The crash attenuator end cap 120 provides crash attenuation for impacts over a wide variety of speeds. The construction of the crash attenuator allows the unit to be quickly and inexpensively refurbished after an impact, in contrast to many prior art attenuators which were simply destroyed by even a minor impact. Moreover, the construction of the attenuator reduces wear and tear on the energy absorbing bodies which in prior art attenuators would tend to quickly degrade from vibration and exposure to the elements. The attenuator, through the provision of the slider and frame, even provides some crash attenuation capability when the crash cushion is not in its deployed position.

A truck properly weighted and equipped with the crash attenuator of the present invention can decelerate a vehicle and absorb the impact of a collision. By safely stopping the colliding vehicle, the attenuator increases the probability that the operator and passengers of the vehicle will survive the collision, in addition to protecting workers at the site from being struck by the errant vehicle.

What is claimed:

1. A crash attenuator adapted to be mounted on a vehicle to attenuate some of the energy of an impact, the crash attenuator comprising a frame adapted to be mounted on a vehicle;
    a slider mounted on the frame to slide relative to the frame along a generally horizontal plane toward the vehicle in response to an impact;
    a collapsible, energy-absorbing member positioned between the slider and the frame to absorb energy as the slider telescopes relative to the frame;
    and a crushable, energy-absorbing crash cushion on the outboard side of the slider.

2. A crash attenuator adapted to be mounted on a vehicle to attenuate some of the energy of an impact, the crash attenuator comprising a frame adapted to be mounted on a vehicle, wherein the frame comprises at least two vertically oriented panels projecting outwardly from the vehicle when the frame is mounted thereon;
    a slider mounted on the frame to slide relative to the frame toward the vehicle in response to an impact, the slider being mounted between the vertical panels, and wherein there are tracks and track followers on the panels and the slider, to guide the relative movement of the slider with respect to the frame;
    a collapsible, energy-absorbing member positioned between the slider and the frame to absorb energy as the slider telescopes relative to the frame;
    and a crushable, energy-absorbing crash cushion on the outboard side of the slider.

3. A crash attenuator adapted to be mounted on a vehicle to attenuate some of the energy of an impact, the crash attenuator comprising a frame adapted to be mounted on a vehicle, wherein the frame comprises at least two vertically oriented panels projecting outwardly from the vehicle when the frame is mounted thereon;
    a slider mounted on the frame to slide relative to the frame toward the vehicle in response to an impact, the slider being mounted between the vertical panels, and wherein there are tracks and track followers on the panels and the slider, wherein the tracks extend generally horizontally, to guide the relative movement of the slider with respect to the frame;
    a collapsible, energy-absorbing member positioned between the slider and the frame to absorb energy as the slider telescopes relative to the frame;
    and a crushable, energy-absorbing crash cushion on the outboard side of the slider.

4. The crash attenuator according to claim 1 wherein the crushable energy absorbing crash cushion is pivotally mounted to the slider about a horizontal axis to pivot between a horizontal deployed position in which the cushion extends generally outwardly from the vehicle, and a vertical position in which the crash cushion extends vertically upwardly.

5. The crash attenuator according to claim 1 wherein the crushable energy absorbing crash cushion comprises a proximal section, adjacent the slider, and a distal section on the opposite side of the proximal section from the slider, the distal section being more readily collapsed than the proximal section.

6. A crash attenuator adapted to be mounted on a vehicle to attenuate some of the energy of an impact, the crash attenuator comprising a frame adapted to be mounted on a vehicle;
    a slider mounted on the frame to slide relative to the frame toward the vehicle in response to an impact;
    a collapsible, energy-absorbing member positioned between the slider and the frame to absorb energy as the slider telescopes relative to the frame;
    and a crushable, energy-absorbing crash cushion on the outboard side of the slider wherein the crushable energy absorbing crash cushion comprises a proximal section, adjacent the slider, and a distal section on the opposite side of the proximal section from the slider, the distal section being more readily collapsed than the proximal section, wherein the distal section includes a side cushion on each side, and an end cushion at the distal end of the distal section.

7. The crash attenuator according to claim 5 wherein the distal section has a lower crush resistance than the proximal section to crush before the proximal section.

* * * * *